July 1, 1930.  T. J. STURTEVANT  1,769,721
AIR SEPARATOR
Filed Aug. 14, 1928   3 Sheets-Sheet 1

INVENTOR:
Thomas J. Sturtevant
BY
Henry F. Williams,
ATTORNEY

July 1, 1930. T. J. STURTEVANT 1,769,721
AIR SEPARATOR
Filed Aug. 14, 1928  3 Sheets-Sheet 2
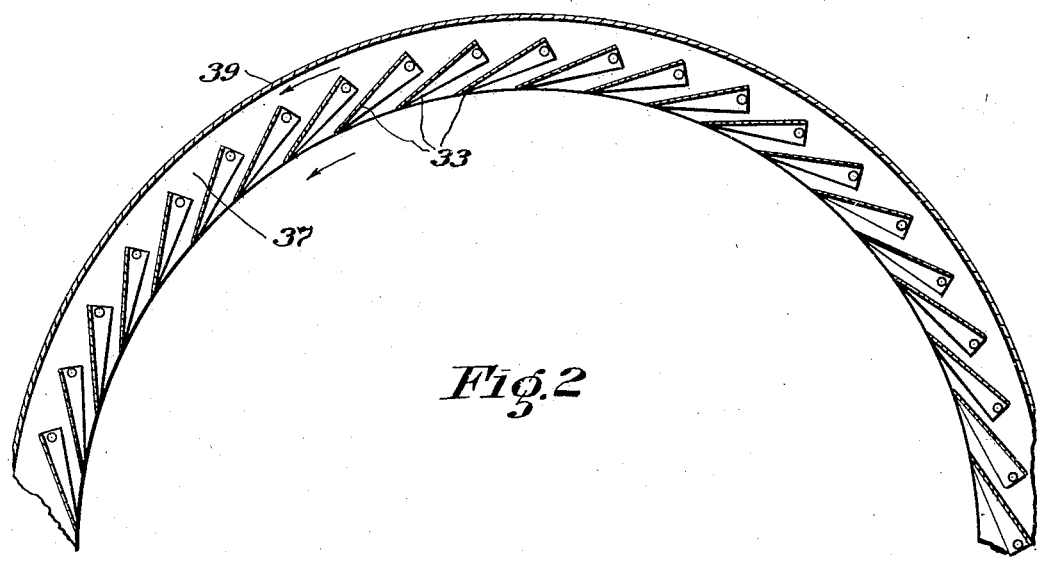
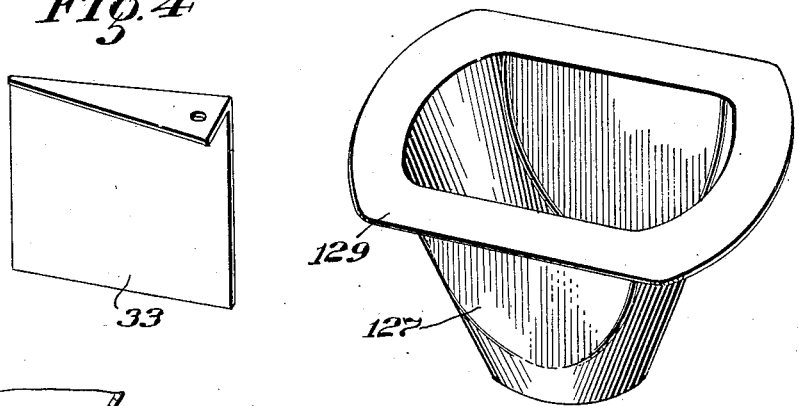
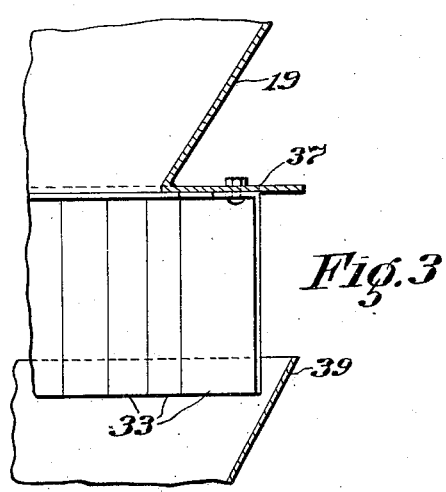
INVENTOR:
Thomas J. Sturtevant
BY Henry T. Williams,
ATTORNEY July 1, 1930.  T. J. STURTEVANT  1,769,721
AIR SEPARATOR
Filed Aug. 14, 1928   3 Sheets-Sheet 3
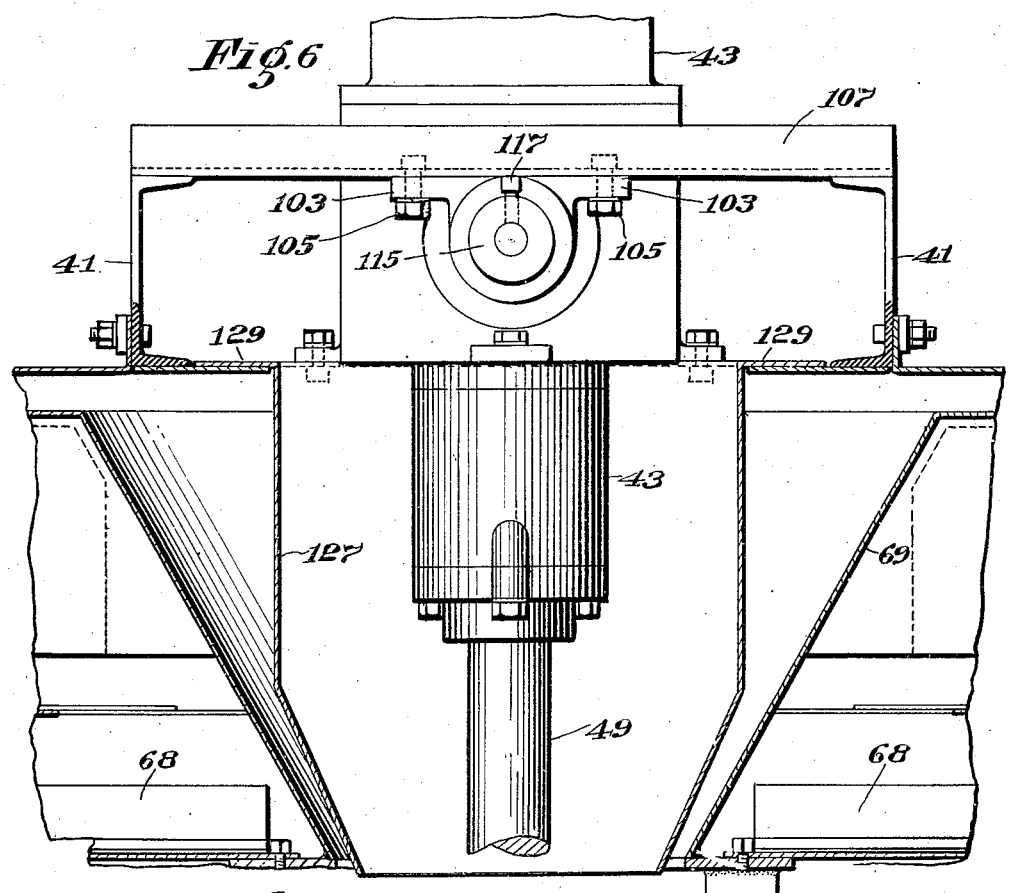
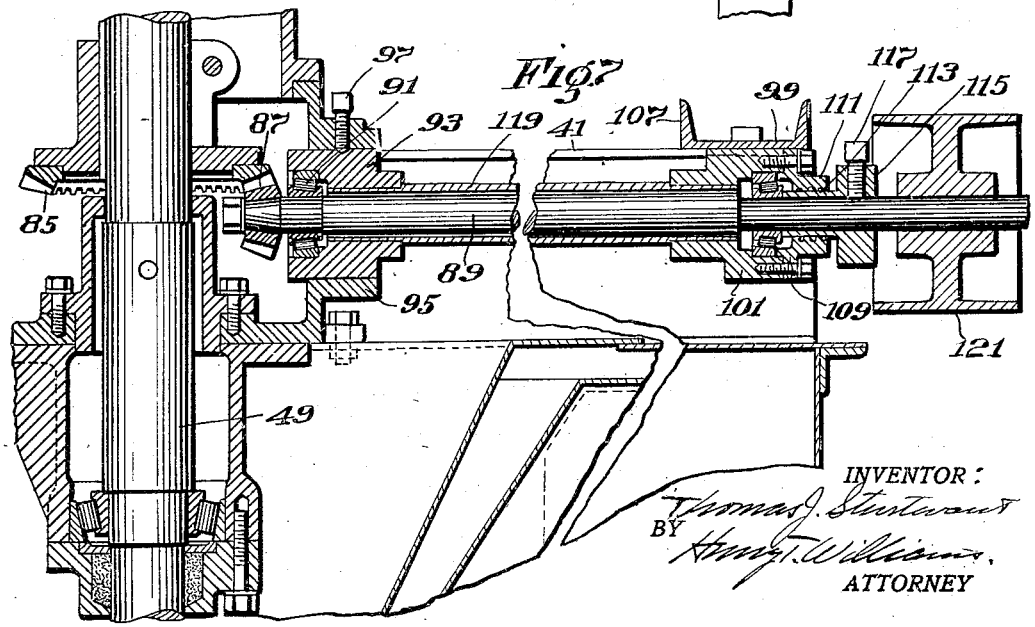
INVENTOR:
Thomas J. Sturtevant
BY Henry T. Williams
ATTORNEY Patented July 1, 1930

1,769,721

UNITED STATES PATENT OFFICE

THOMAS J. STURTEVANT, OF WELLESLEY, MASSACHUSETTS, ASSIGNOR TO STURTEVANT MILL COMPANY, OF BOSTON, MASSACHUSETTS, A CORPORATION OF MASSACHUSETTS

AIR SEPARATOR

Application filed August 14, 1928. Serial No. 299,534.

The invention to be hereinafter described relates to air separators for grading materials.

The invention is embodied in a separator of the type wherein the separation is accomplished by an air current moving upward in a separating chamber and downward in a settling chamber. The air current is induced by a fan and caused to circulate through the chambers, and in its course it passes through a space between the upper and lower shells forming the casing of the separating chamber. The materials to be graded are fed into the separating chamber and are received by a rotary distributor which throws the materials out across the rising air current under the influence of centrifugal force. The lighter particles are carried upward by the air current from the separating chamber over into the settling chamber where they gravitate downward and are delivered therefrom while the heavier particles gravitate down through the air current in the separating chamber and are separately delivered.

Heretofore, a series of vanes have been provided adjacent the upper and lower shells of the separating chamber casing, but they have been so disposed and arranged, and the construction of the shells adjacent thereto has been such that there is a tendency for some of the coarser particles whirling in the separating chamber to escape between the vanes into the settling chamber under the influence of centrifugal force. Also, with the construction heretofore employed, it has been found that the downward whirling air current in the settling chamber in flowing between the vanes into the separating chamber, is deflected downward into the separating chamber a substantial distance beneath the vanes and interferes with the desired efficiency of operation.

A purpose of the present invention, therefore, is to provide vanes which are locate within the separating chamber in overlapped relation, and are so disposed with respect to the adjacent portions of the upper and lower shells of the separating chamber that escape of the heavier particles from the separating chamber between the vanes into the settling chamber is prevented, and the air current makes a sharper turn in flowing from the settling chamber between the vanes into the separating chamber.

With the aforesaid and other purposes in view, the character of the invention may be best understood by reference to the following description of one good form thereof shown in the accompanying drawings, wherein:

Fig. 2 is a horizontal section taken on line 2—2 of Fig. 1 showing the disposition of the vanes;

Figure 1:
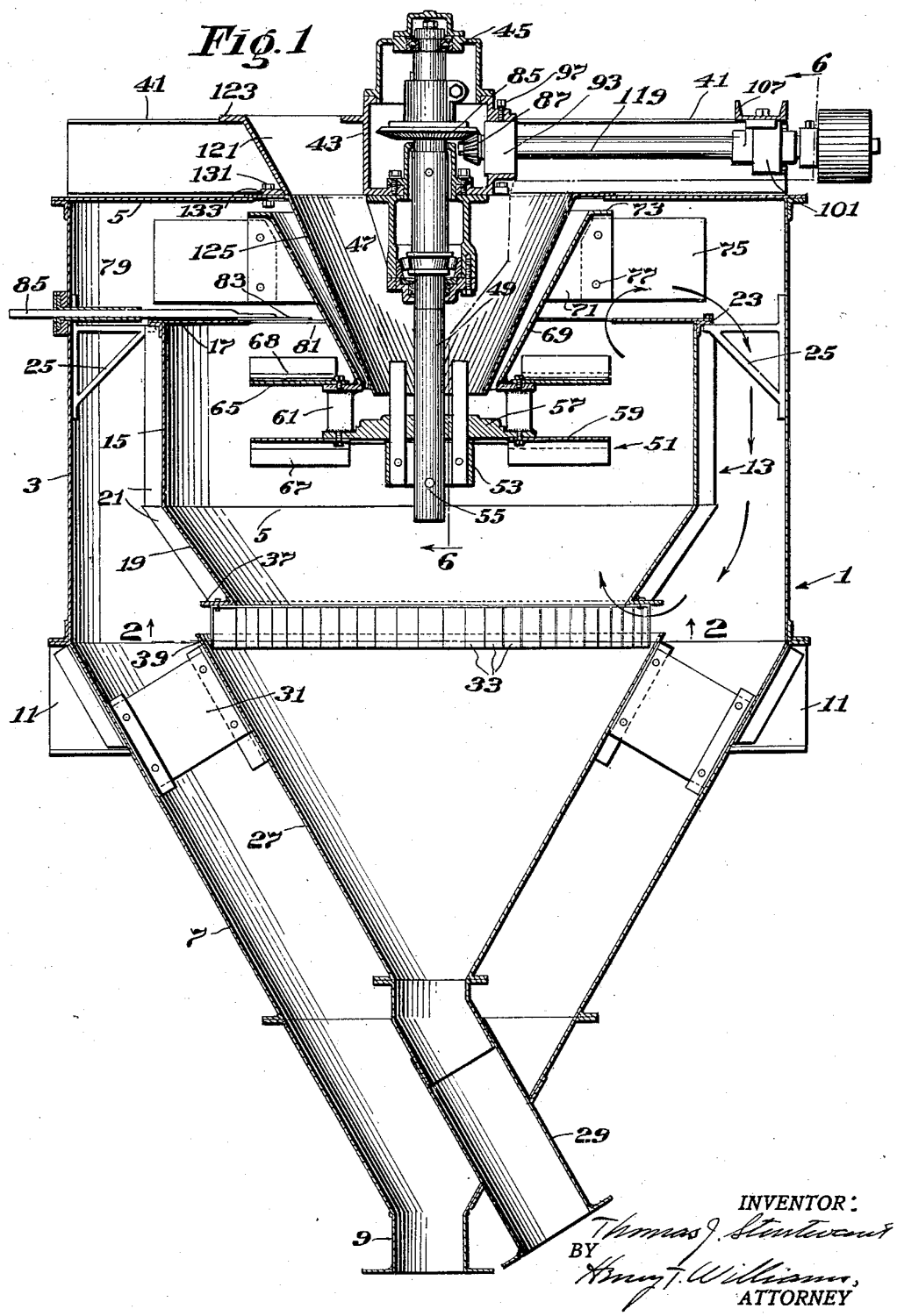
Fig. 1 is a vertical section through an air separator embodying the invention.

Fig. 3 on an enlarged scale is a view of portions of the upper and lower shells of the inner casing and the arrangement of vanes relatively thereto;

Fig. 4 is a perspective view of one of the vanes;

Fig. 5 is a perspective view of the hopper which leads to the distributor;

Fig. 6 on an enlarged scale is a vertical section taken on line 6—6 of Fig. 1; and Fig. 7 on an enlarged scale is a vertical section through the vertical and horizontal shafts, the gears thereon, and the bearings therefor.

Referring to the drawings, the separator shown therein as one good form of the invention, comprises an outer casing 1 (Fig. 1) consisting of a drum 3 having a head 5 at the upper end thereof and a cone 7 at the lower end thereof terminating in a discharge spout 9. This outer casing is provided with brackets 11 adapted to rest upon and be secured to suitable supporting beams.

Within and spaced from the outer casing is an inner casing 13 consisting of a drum 15 having a head 17 at the upper end thereof, and a conical shell 19 at the lower end thereof, said drum and shell being provided with angle iron stiffening ribs 21. Secured to the upper end of the drum 15 is an angle iron ring 23 resting upon and secured by bolts to brackets 25 secured to the outer casing.

Beneath and spaced from the shell 19 is a lower conical shell 27 communicating with a discharge spout 29 which extends through an opening in the cone 7 of the outer casing. The lower shell 27 is supported from the outer cone 7 by webs 31 secured to angle bars secured in turn to said shell and cone.

The space between the upper and lower shells of the inner casing serves as an inlet for the passage of air current from the settling chamber into the separating chamber. Located at this space are a series of laterally overlapping vanes 33 (Figs. 1, 2, 3 and 4), each having a triangular shaped flange 35 at the upper end thereof. These vanes are secured to a ring 37 welded to the lower end of the conical sell 19 and projecting out therefrom. The flanges of the vanes engage the under face of this ring and are secured thereto by rivets or bolts which extend through registering holes in the ring and vane flanges. The pivotal points of the vanes are adjacent the outer ends thereof so that the vanes may be adjusted to vary the spacing of their inner free ends without substantial variation in the spacing of the pivoted ends of the vanes. The vanes project down somewhat into the lower conical shell 27, and the lower ends thereof are spaced slightly from said shell. The upper marginal portion 39 of said shell projects outward and upward beyond the lower ends of the vanes.

There are important advantages in this construction and arrangement of the vanes. The air current is whirling in the separating chamber tangentially along the vanes toward the free edges thereof as indicated by the arrow in Fig. 2, and the heavier particles in the separating chamber, carried outward under the influence of centrifugal force to the vanes, will sweep along the same, but will be prevented from passing through the spaces between the vanes into the settling chamber due to the overlapped or shingled-like arrangement of the vanes and their location within the separating chamber. However, the construction is such that the whirling air current in the settling chamber may readily flow between the vanes into the separating chamber.

Since the upper margin 39 of the lower conical shell 27 is inclined, and projects upward beyond the vanes and presents a thin upper edge, accumulation of materials at the upper end of said shell will be prevented. Since the vanes are located at the lower end of the upper conical shell 19 of the separating chamber, are not out beyond said shell and extend down beyond the lower edge thereof, the circulating air current may pass with an easy curve from the settling chamber up around the lower edge of the upper conical shell into the separating chamber, as indicated by the arrows in Fig. 1, whereas in constructions previously employed the air swept a substantial distance down into the lower conical cone of the separating chamber with less efficient results. Still another advantage in this arrangement of vanes resides in the fact that their lower ends are free and they are carried wholly by the ring 37 at the lower end of the upper conical shell 19, thereby facilitating ready angular adjustment of the vanes according to conditions as required.

At the top of the separator are a pair of beams or channels 41 supporting a housing 43 having an upper ball bearing 45 and a lower roller bearing 47. Journalled in these bearings is a vertical shaft 49 carrying a rotary distributor 51 comprising a hub 53 supported on the shaft by a bolt 55. Mounted on said hub is a stepped plate 57 and bolted to said plate is a circular plate 59. Rising from and welded to the stepped plate are posts or spokes 61 supporting and welded to a ring 63 having a baffle plate 65 bolted thereto. The distributor plate 59 and baffle plate 65 are respectively provided with air whirl promoting vanes 67 and 68.

The fan comprises a large conical hub 69 encircling and spaced from the hopper and having its lower end welded too the baffle plate ring 61. Plates 71 of general triangular shape have their inner edges welded to the conical hub 69 and their upper edges welded to an outstanding flange 73 at the top of said hub. The fan blades 75 overlap the plates 71 and are detachably secured thereto by bolts 77 entered through pairs of registering holes in the blades and plates. The welded assembly of parts including the stepped plate 57, spokes 61, ring 63, fan hub 69 and blade carrying plates 71 constitutes a simple, strong, effective unit. The blades are located in a chamber 79 between the outer and inner casing heads, and develop the whirling air current which circulates up through the separating chamber through an opening 81 in the inner casing head through the chamber 79 down in the settling chamber, and between the vanes 33 back into the separating chamber. To regulate the size of the opening 81 a valve may be provided desirably in the form of a series of overlapped plates 83 having arms 85 which extend through and beyond the outer casing where they are accessible for radial adjustment to vary the size of the opening 81. Since this valve is of a construction well understood in the art, it is unnecessary is show the same in detail herein.

To rotate the vertical shaft 49 which carries the distributor, baffle plate and fan, a bevel gear 85 is mounted on said shaft and meshes with a bevel pinion 87 on a horizontal shaft 89 (Fig. 7). The inner end of this shaft is journalled in a roller bearing 91 in a cylindrical box 93 mounted in a boss 95 projecting out from the gear housing, said box being secured in its desired position of adjustment by set screws such as the set screw 97. The outer end of the shaft is journalled in a roller bearing 99 in a box 101 having ears 103 secured by bolts 105 to a transverse bar 107 mounted upon and bridging the channels 41 referred to. The box 101 has a head 109 provided with a boss 111 spaced somewhat from the shaft to receive a collar 113 having an outstanding flange 115 secured to the shaft by set screws such as the set screw 117. The inner bearing box 93 is shrunk onto a reduced end of a sleeve 119 containing the shaft, and the outer bearing box 101 is shrunk onto the opposite reduced end of said sleeve. Mounted on the shaft is a pulley 121 which may be driven from any suitable source of power.

This horizontal shaft and bearing construction has important advantages. The bearing boxes 93, 101 and sleeve 119 constitute a simple and effective unit. Since the box 93 is mounted in the boss 95 and secured thereto by the set screws 97, and the box 101 is secured firmly to the transverse channel 107, proper alinement of the bearings is insured and without the necessity of providing ball and socket self-alining bearing boxes. To secure proper meshing of the bevel gears, the set screws and bolts for the boxes may be released, and the boxes and their connecting sleeve may be adjusted longitudinally as required. To make the adjustment for taking up any wear on the roller bearings, it is merely necessary to release the screw 117 and to adjust the sleeve 113, thereby shifting the inner raceway of the roller bearing 99 along the shaft to take up the lost motion, and at the same time the shaft will be adjusted to take up any lost motion in the roller bearing 91. Since the roller bearing 91 is enclosed by the box 93 and the gear housing 43, and the roller bearing 99 is enclosed by the boxes 101, the head 109 and the sleeve 113, a desirable dust-proof construction is provided. Lubricant may be applied to the bearing 99, and will flow through the space between the horizontal shaft and the sleeve 119 to the bearing 91, so that lubricant for both bearings may be applied at one point.

To conduct the materials to be graded into the separator, an upper hopper 121 is provided having a flange 123 resting upon and secured to the channels 41, and said hopper and the gear housing 43 may desirably be formed in one casting. Depending from and communicating with the upper hopper is a lower hopper 125 (Figs. 1, 5 and 7) of general conical form having opposed flat sides 127. The mouth of the hopper is of general oblong form and has an outstanding flange 129 secured by bolts 131 to an outstanding flange 133 at the lower end of the upper hopper. The lower hopper flange 125 is of sufficient width to overlie the margin surrounding the opening in the outer casing head. The construction is such that the upper hopper 121, gear housing and the lower hopper 125 may be lifted from the separator up through the space between the channels 41 at the top of the separator.

It will be understood that the invention is not limited to the specific embodiment shown, and that various deviations may be made therefrom without departing from the spirit and scope of the appended claims.

What is claimed is:

1. An air separator for grading materials comprising, in combination, an outer casing, an inner casing comprising upper and lower shells having a space between them, a settling chamber between said casings, a separating chamber in the inner casing, a fan for causing air to whirl and circulate through said chambers and space, the lower shell having a thin free upper edge, and a series of spaced air whirl promoting vanes extending from the lower edge of the upper shell down into the lower shell beneath the free upper edge thereof, said vanes being in laterally overlapping tangential relation and pivotally connected to and carried by the upper shell.

2. An air separator for grading materials comprising, in combination, an outer casing, an inner casing comprising upper and lower shells, the lower edge of the upper shell being above the upper edge of the lower shell, a settling chamber between said casings, a separating chamber in the inner casing, a fan for causing air to whirl and circulate through said chambers, and a series of spaced air whirl promoting vanes extending from the lower edge of the upper shell down into the lower shell, said vanes being in laterally overlapping tangential relation and pivotally connected to and carried by the upper shell, the lower ends of said vanes being spaced somewhat from the inner surface of the lower shell.

3. An air separator for grading materials comprising, in combination, an outer casing, an inner casing comprising upper and lower shells having a space between them, a settling chamber between said casings, a separating chamber in the inner casing, a fan above the separating chamber for causing air to whirl and circulate through said chambers, and a series of spaced air whirl promoting vanes in laterally overlapping tangential relation and extending from the lower edge of the upper shell down into the lower shell, said vanes being pivotally connected to the upper shell, the pivotal points of the vanes being adjacent the outer ends thereof, that the vanes may be adjusted to vary the spacing of their inner free ends without substantial variation in the spacing of the pivoted ends of the vanes.

THOMAS J. STURTEVANT.